3,516,908
PROCESS FOR THE PREPARATION OF HEXAHYDROINDANE DICARBOXYLIC ACID DERIVATIVES
Shohei Hayakawa, Hyogo Prefecture, Yoshiko Kanematsu, Kyoto-shi, and Takashi Fujiwara, Hyogo Prefecture, Japan, assignors to Shionogi & Co., Ltd., Osaka, Japan
No Drawing. Continuation-in-part of application Ser. No. 708,453, Nov. 20, 1967, which is a division of application Ser. No. 478,735, Aug. 10, 1965. This application Oct. 29, 1968, Ser. No. 771,611
Int. Cl. C12d 1/02
U.S. Cl. 195—51        4 Claims

ABSTRACT OF THE DISCLOSURE

4α(2 - carboxyethyl) - 5 - oxo-(1α-hydrogen- or 1α-hydroxyl) - 7aβ - methyl - 3aα-hexahydroindane-carboxylic acids and lower alkanoic acids, which are prepared by one-step fermentative degradation of the bile acids or their homologues, are useful as cholesterol lowering agents.

---

This application is a continuation-in-part application of application Ser. No. 708,453, filed Nov. 20, 1967 which is a division of application Ser. No. 478,735, filed Aug. 10, 1965, both of which are abandoned.

This invention relates to the preparation of novel hexahydroindane dicarboxylic acid derivatives. More particularly, it relates to the preparation of novel useful compounds represented by the general formula:

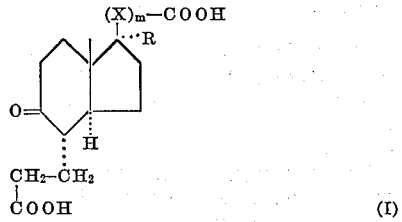

wherein X is —CH$_2$—, —CH(CH$_3$)— or

—CH(CH$_3$)—(CH$_2$)$_n$— in which n is an integer from 1 to 4 inclusive; m is zero or 1; and R is a hydrogen atom or a hydroxyl group. Compounds I are useful as cholesterol metabolism controlling agents for treatment of hypercholesterolemia in human and other warm-blooded animals.

A primary object of the invention is to embody a one-step fermentative degradation of steroids into hexahydroindane dicarboxylic acid derivatives.

Compounds I can be prepared by a process which comprises cultivation of corynebacterium (Arthrobacter) simplex in a culture medium containing one or more of the steroidal substances of the formula:

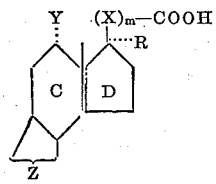

wherein X, m and R have the same significances as defined above; Y means a hydrogen atom or hydroxyl group and Z is selected from the group:

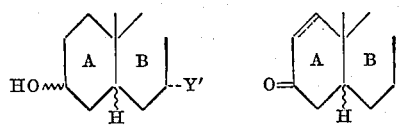

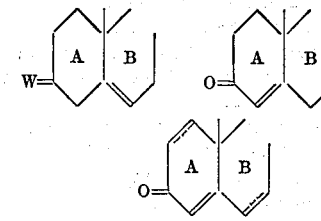

wherein Y′ means a hydrogen atom or hydroxyl group; W means α- or β-hydroxyl group or oxo group and broken line means absence or presence of a double bond, as main carbon sources.

Among the starting compounds which fall in the above designation, the following are smoothly consumed and converted by the Corynebacterium in the process of the present invention:

3α,7α,12α-trihydroxy-5β-androstane-17β-carboxylic acid,
3-oxo-5β-androstane-17β-carboxylic acid,
3-oxoandrost-4-ene-17β-carboxylic acid,
3α-hydroxyandrost-5-ene-17β-carboxylic acid,
3-oxoandrosta-1,4-diene-17β-carboxylic acid,
3-oxo-17α-hydroxy-5β-androstane-17β-carboxylic acid,
3-oxo-17α-hydroxy-5α-androstane-17β-carboxlic acid,
3-oxo-17α-hydroxyandrost-4-ene-17β-carboxylic acid,
3-oxo-17α-hydroxyandrosta-1,4-diene-17β-carboxylic acid,
3α,17α-dihydroxyandrostane-17β-carboxylic acid,
3β,17α-dihydroxyandrostane-17β-carboxlic acid,
3β,17α-dihydroxyandrost-5-ene-17β-carboxylic acid,
3-oxo-23-nor-5β-cholan-22-oic acid,
3-oxo-23-norchol-4-en-22-oic acid,
3β-hydroxy-23-norchol-5-en-22-oic acid,
3-oxo-23-norchola-1,4-dien-22-oic acid,
3-oxo-23-norchol-5-en-22-oic acid,
3-oxo-17α-hydroxy-23-norchol-4-en-22-oic acid,
3-oxo-17α-hydroxy-23-norchol-5-en-22-oic acid,
3β-hydroxy-17α-hydroxy-23-norchol-5-en-22-oic acid,
3-oxo-17α-hydroxy-23-norchola-1,4-dien-22-oic acid,
3-oxo-17α-hydroxy-23-norchol-5-en-22-oic acid,
lithocholic acid,
deoxycholic acid,
cholic acid,
3-oxochol-4-enic acid,
3β-hydroxychol-5-enic acid,
3-oxo-7α,12α-dihydroxy-chol-4-enic acid,
3-oxochola-1,4-dienic acid,
3-oxo-12α-hydroxychola-4,6-dienic acid,
3-oxo-17α-hydroxychol-4-enic acid,
3β,17α-dihydroxychol-5-enic acid,
3-oxo-7α,12α,17α-trihydroxychol-4-enic acid,
3-oxo-17α-hydroxychola-1,4-dienic acid,
3-oxo-12α-hydroxychola-4,6-dienic acid,
17α-hydroxylithocholic acid.

The other compounds which also fall in the same designation are not smoothly consumed and converted solely in the reaction. However, such compounds can also be utilized when the ensyme systems in the used microbe is previously or simultaneously adapted or induced by contact with the above-mentioned easily utilizable substrates. For such procedure, the following compounds may be illustrated as the starting materials:

3α-hydroxy-5β-androstane-17β-carboxylic acid,
3α,12β-dihydroxy-5β- androstane-17β-carboxylic acid,
3α,7α-dihydroxy-5β-androstane-17β-caboxylic acid,
3-oxo-5α-androstane-17β-carboxylic acid,
3β-hydroxyandrost-5-ene-17β-carboxylic acid,
3-oxo-12α-hydroxyandrosta-4,6-diene-17β-carboxylic acid,
3α-hydroxy-5β-pregnan-21-oic acid,
3-oxo-5α-pregnan-21-oic acid,
3-oxopregn-4-en-21-oic acid, 3β-hydroxypregn-5-en-21-oic acid,
3-oxopregna-1,4-dien-21-oic acid,
3α-hydroxy-23-nor-5β-cholan-22-oic acid,
3α,12α-dihydroxy-23-nor-5β-cholan-22-oic acid,
3α,7α-dihydroxy-23-nor-5β-cholan-22-oic acid,
3α,7α,12α-trihydroxy-23-nor-5β-cholan-22-oic acid,
3-oxo-12α-hydroxy-23-nor-5β-cholan-22-oic acid,
3-oxo-23-nor-5α-cholan-22-oic acid,
3α,12α-dihydroxy-24-nor-5β-cholan-23-oic acid,
3α,7α,12α-trihydroxy-24-nor-5β-cholan-23-oic acid,
3-oxo-24-nor-5α-cholan-23-oic acid,
3-oxo-24-norchol-4-en-23-oic acid,
3β-hydroxy-24-norchol-5-en-23-oic acid,
3-oxochola-1,4-dien-24-oic acid,
chenodeoxycholic acid,
3-oxo-5β-cholanic acid,
3-oxo-12α-hydroxy-5β-cholanic acid,
3-oxo-5α-chloanic acid,
3-oxo-12α-hydroxy-5α-cholanic acid,
3-oxo-5β-chol-1-enic acid,
3-oxo-12α-hydroxy-5β-chol-1-enic acid,
3-oxo-5α-chol-1-enic acid,
3-oxo-12α-hydroxychol-4-enic acid,
3α-hydroxychol-5-enic acid,
3α,12α-dihydroxychol-5-enic acid,
3β,12α-dihydroxy-chol-5-enic acid,
3-oxo-12α-hydroxychola-1,4-dienic acid,
3α,7α,12α-trihydroxy-5β-cholane-24-carboxylic acid,
3-oxo-5β-cholane-24-carboxylic acid,
3-oxochol-4-ene-24-carboxylic acid,
3β-hydroxychol-5-ene-24-carboxylic acid,
3α-hydroxy-27-nor-5β-cholestan-26-oic acid,
3α,7α,12α-trihydroxy-27-nor-5β-cholestan-26-oic acid,
3-oxo-27-nor-5β-cholestan-26-oic acid,
3-oxo-27-norcholest-5-en-26-oic acid,
3α-hydroxy-5β-cholestan-26-oic acid,
3α,12α-dihydroxy-5β-cholestan-26-oic acid,
3α,7α-dihydroxy-5β-cholestan-26-oic acid,
3α,7α,12α-trihydroxy-5β-cholestan-26-oic acid,
3-oxo-5α-cholestan-26-oic acid,
3β-hydroxy-cholest-5-en-26-oic acid,
3β,17α-dihydroxy-23-norchol-5-en-22-oic acid,
3-oxo-17α-hydroxy-chol-4-ene-24-carboxylic acid,
3-oxo-17α-hydroxy-5β-cholane-24-carboxylic acid.

They are used in the reaction not only as free acid form but also as the corresponding water-soluble salt form such as sodium salt or potassium salt. The conjugated compounds such as glyco- and tauro-cholic acid, -deoxycholic acid, -lithocholic acid, etc, or the mixture thereof, especially crude preparations of ox bile extract, etc. can be used also effectively.

The reaction can be carried out by the conventional aerobic cultivation method except for using *Corynebacterium simplex* and the above-mentioned steroidal substances solely or in combination as the carbon source. However, in many cases, it was found that addition of the conventional carbon sources such as glucose decreased the yield of the products. The reaction may be carried out at a temperature between about 25 and about 35° C., a pH between about 6.5 and about 8.0, with agitation and aeration. The culture medium should contain nitrogen source such as peptone, urea, ammonium sulfate or the like, and several inorganic salts found generally to be effective to promote the growth of microorganisms. Maximum yield of the products is generally approached in from about 1 to 5 days. The optimal reaction period can be preferably determined by check with chromatographic techniques especially with thin-layer chomatography. It will be understood that the yield of the product and optimal reaction period varies with kind of the starting compound used or method of induction or adaptation. It is generally noted that lower molecular weight of the starting compound requires shorter reaction period and affords higher yield.

The specific examples of the products thereby obtained are

1β-carboxy-5-oxo-7aβ-methyl-3aα-hexahydroindane-4α-propionic acid,
1β-carboxy-1α-hydroxy-5-oxo-7aα-methyl-3aα-hexahydroindane-4α-propionic acid,
1β-carboxymethyl-5-oxo-7aβ-methyl-3aα-hexahydroindane-4α-propionic acid,
1β-carboxymethyl-1α-hydroxy-5-oxo-7aβ-methyl-3aα-hexahydroindane-4α-propionic acid,
1β-(1-carboxyethyl)-5-oxo-7aβ-methyl-3aα-hexahydroindane-4α-propionic acid,
1β-(1-carboxyethyl)-1α-hydroxy-5-oxo-7aβ-methyl-3aα-hexahydroindane-4α-propionic acid,
4α-(2-carboxyethyl)-5-oxo-7aβ,β-dimethyl-3aα-hexahydroindane-1β-propionic acid,
4aα-(2-carboxyethyl)-1α-hydroxy-5-oxo-7aβ,β-dimethyl-3aα-hexahydroindane-1β-propionic acid,
4α-(2-carboxyethyl)-5-oxo-7aβ,γ-dimethyl-3aα-hexahydroindane-1β-butyric acid,
4α-(2-carboxyethyl)-1α-hydroxy-5-oxo-7aβ,γ-dimethyl-3aα-hexahydroindane-1β-butyric acid,
4α-(2-carboxyethyl)-5-oxo-7aβ,δ-dimethyl-3αβ-hexahydroindane-1β-valeric acid,
4α-(2-carboxyethyl)-1α-hydroxy-5-oxo-7aβ,δ-dimethyl-3aα-hexahydroindane-1β-valeric acid,
4α-(2-carboxyethyl)-5-oxo-7aβ,ε-dimethyl-3aα-hexahydroindane-1β-caproic acid,
4α-(2-carboxyethyl)-1α-hydroxy-5-oxo-7aβ,ε-dimethyl-3aα-hexahydroindane-1β-caproic acid,
4α-(2-carboxyethyl)-5-oxo-7aβ,α,ε-trimethyl-3aα-hexahydroindane-1β-caproic acid,
4α-(2-carboxyethyl)-5-oxo-7aβ,α,ε-trimethyl-3aα-hexahydroindane-1β-caproic acid
and their alkali metal salts.

It is to be noted that during the course of the reaction, the hydroxy group or alkanoyloxy group located at position 7 or 12 of the starting steroid compound disappears to give the corresponding 7- and 2'-methylene group of 4-(2-carboxyethyl)-hexahydroindane skeleton.

The compounds I decrease plasma total cholesterol and phospholipid levels, and increase the plasma total cholesterol/plasma phospholipid level ratio. For example, 4α-(2-carboxyethyl)-5-oxo-7aβ,γ-dimethyl-3aα-hexahydroindane-1β-butyric acid decreases plasma total cholesterol level —10.7% and phospholipid level —17.9%, and increases C/P ratio 7.9% in rats by oral administration or subcutaneous injection, 1 mg.×10 days, and 1β-(1-carboxyethyl)-5-oxo-7aβ-methyl-3aα-hexahydroindane-4α-propionic acid decreases plasma total cholesterol level —8.0% and phospholipid level —7.5% and increases C/P ratio 3% in rats by oral administration or subcutaneous injection, 5 mg.×10 days. They can be administered to man or warm-blooded animals suffering from hypercholesterolmia or hypertension in a form of conventional preparations such as injections, tablets, powders, pills, granules, liquids, etc. A suitable daily dose is 0.1–100 mg./day per kg. of body weight.

The following examples serve to illustrate practical embodiments of the preparation method of the present invention, but they are not intended to limit the scope of the invention. Percentages are by weight.

EXAMPLE 1

An aqueous culture medium (1.1 liters) containing:

| | Percent |
|---|---|
| Ammonium sulfate | 0.2 |
| Potassium dihydrogen phosphate | 0.1 |
| Magnesium sulfate (heptahydrate) | 0.05 |
| Potassium chloride | 0.05 |
| Ferrous sulfate (heptahydrate) | 0.01 |
| Yeast extract | 0.05 |
| Sodium cholate | 0.1 | is adjusted to pH 7.15 by addition of 10%-aqueous sodium hydroxide solution and divided into 100 ml. (milliliter) portions, which are severally placed in 500 ml. Sakaguchi's shaking bottles. After sterilization, the bottles are inoculated with *Corynebacterium simplex* (IFO 3530 or ATCC 6967 strain) and thereafter cultivated at 28° C. under shaking. After completion of cultivation (around 4–5 days), the culture broth is adjusted to pH 4.0 by addition of 10%-aqueous hydrochloric acid solution and extracted with ether or ethyl acetate. The extract is washed with water, dried with anhydrous sodium sulfate and distilled to remove solvent. The crystalline residue thereby left behind (235 milligrams) affords prismatic 4α-(2-carboxyethyl) - 5 - oxo-7aβ,γ-dimethyl-3aα-hexahydroindane-1β-butyric acid (M.P. 169.5–170° C. yield: about 20–30%). $[\alpha]_D^{24} + 20.5 \pm 5°$ (c.=0.45, in ethanol).

IR: $\nu_{max.}^{Nujol}$ 3150–2700 1703 cm.$^{-1}$

UV: no characteristic absorption band.

*Analysis.*—Calcd. for $C_{18}H_{28}O_5$ (percent): C, 66.64; H, 8.70. Found (percent): C, 66.71; H, 8.70.

EXAMPLE 2

Essentially the same treatment as in the above Example 1, except for utilization of ox bile extract (oxgall) in 0.1–0.2% concentration instead of 0.1% of sodium cholate, in the same culture medium, affords the same product in a yield of around 20%.

EXAMPLE 3

Essentially the same treatment as in the above Example 1, except for replacement of sodium cholate by an equal amount of sodium lithocholate, in the same culture medium, affords the same product in a yield of around 20%.

EXAMPLE 4

Essentially the same treatment as in the above Example 1, except for replacement of sodium cholate by an 0.1% of an equimolar mixture of sodium cholate and sodium chenodeoxycholate, in the said cultivation medium, affords the same product in an about 20% yield.

EXAMPLE 5

Essentially the same treatment as in the above Example 1, except for replacement of sodium cholate by an 0.1% of an equimolar mixture of sodium cholate and sodium deoxycholate, in the same cultivation medium, affords the same product in an about 20% yield.

EXAMPLE 6

An essentially equal result is obtained with a culture medium containing the following (pH 7.15–7.4):

| | Percent |
|---|---|
| Ammonium sulfate | 0.2 |
| Dipotassium hydrogen phosphate | 0.1 |
| Magnesium sulfate (heptahydrate) | 0.05 |
| Ferric chloride (hexahydrate) | 0.001 |
| Sodium cholate | 0.1 |

EXAMPLE 7

The addition of 0.05% of yeast extract to the culture medium in the Example 6 affords the similar result.

EXAMPLE 8

A culture medium (50 liters) of the same constitution as in the Example 1, except for replacement of the pure sodium cholate by 50 g. of crude crystalline cholic acid (prepared from ox bile extract, containing around 20% of desoxycholic acid) is inoculated with bouillon liquor (500 ml.) precultured with *Corynebacterium simplex* at 28° C. for 24 hours and aerobically cultured at 28° C. for 48 hours under reciprocal shaking at 375 r.p.m. The culture broth is adjusted to pH 2.0 and extracted with ethyl acetate. The extract is counter-extracted with dilute aqueous sodium hydrogen carbonate solution. The alkaline aqueous extract is acidified with hydrochloric acid and then extracted with chloroform. The chloroform layer affords on evaporation a crude product, which is treated with acetone and gives 4α-(2-carboxyethyl)-5-oxo-7aβ,γ-dimethyl-3aα-hexahydroindane-1β-butyric acid in an about 30% yield.

The substance is dissolved in ethanol, added to an equimolar amount of sodium hydroxide and the mixture is concentrated, whereby the corresponding disodium salt (M.P. >300° C.) is obtained. It is soluble in water and is reconverted to the free acid form by the action of acid. By similar treatment, the corresponding dipotassium salt (M.P. >300° C.) is obtained.

EXAMPLE 9

The same treatment as in Example 1 with the culture medium of the same constitution as in Example 1 except for replacement of sodium cholate by an equal amount of sodium 3-oxoandrost-4-ene-17γ-carboxylate affords a crude product in an around 80% yield. By recrystallization from acetone. It is purified and affords 1β-carboxy-5-oxo - 7aβ - methyl - 3aα-hexahydroindane-4α-propionic acid (M.P. 236.5–240.5° C.). $[\alpha]_D^{25} + 34.5 \pm 2°$ (c. =1.064, chloroform).

IR: $\nu_{max.}^{Nujol}$ 3100–2600, 1694 cm.$^{-1}$

UV: no characteristic absorption band.

*Analysis.*—Calcd. for $C_{14}H_{20}O_5$ (percent): C, 62.67; H, 7.51. Found (percent): C, 62.50; H, 7.50.

EXAMPLE 10

*Corynebacterium simplex* (IFO 3530 strain) is precultured at 28° C. for 48 hours in a medium (1 liter) containing 0.5% of glucose, 0.5% of polypeptone, 0.5% of corn steep liquor and 0.1% of sodium 3-oxoandrost-4-ene-17β-carboxylate to make inoculant. A culture medium prepared in the same manner as in Example 1 by using 16.5 g. of sodium 3-oxoandrost-4-ene-17β-carboxylate instead of sodium cholate is placed in a 30-liters jar fermenter, inoculated with inoculant prepared above and then cultured at 30° C. for 114 hours under reciprocal shaking at 250–350 r.p.m., internal pressure 0.5 kg./cm.$^2$ and aeration rate 17 liters/min. The culture broth is adjusted to pH around 2 and extracted with ethyl acetate. The extract is washed with water and distilled to remove the solvent. The distillation residue is triturated with ether to give a crude crystalline product (12.4 g.), which affords 9.06 g. of pure crystals of 1β-carboxy - 5 - oxo - 7aβ-methyl-3aα-hexahydroindane-4α-propionic acid by recrystallization from methanol.

EXAMPLE 11

The same procedure as Example 1 with replacement of the sodium cholate by an equal amount of sodium 3β-hydroxy - 23 - norchol-5-en-22-oate affords crude 1β-(1-carboxyethyl) - 5 - oxo - 7aβ-methyl-3aα-hexahydroindane-4α-propionic acid in a yield of around 40%. On recrystallization from acetone-petroleum ether mixture, it gives pure crystals of M.P. 158.5–159.5° C.

$[\alpha]_D + 0.7 \pm 0.25°$ (c.=3.620, chloroform),

IR: $\nu_{max.}^{Nujol}$ 3200–2800, 1745, 1710, 1680 cm.$^{-1}$

UV: no characteristic absorption.

*Analysis.*—Calcd. for $C_{16}H_{24}O_5$ (percent): C, 64.84; H, 8.16. Found (percent): C, 64.89; H, 8.13.

EXAMPLE 12

Inoculant is prepared by cultivation of 300 ml. of medium of the same constitution as in Example 10 except for replacement of the sodium 3-oxoandrost-4-ene-117β-carboxylate by sodium 3β - hydroxy-23-norchol-5-en-22-oate, at 28° C. for 72 hours. Culture media (2×20 liters) prepared in the same manner as in Example 10 by using sodium 3β-hydroxy-bis-norchol-5-enate (2×20 g.) instead of sodium 3-oxoandrost-4-ene-17β-carboxylate are placed in jar fermenters (2×30 liters), inoculated with the above inoculant and thereafter cultivated aerobically (aeration rate, 20 liters/min.) at 29–32° C. for 45 hours under internal pressure 0.5 kg./cm.$^2$ at 250 r.p.m. The culture broth is adjusted to pH about 2 and extracted with ethyl acetate. The extract is washed with water and distilled to remove solvent. The distillation residue is treated with ether and yields 16.4 of crude product, which affords as crystalline pure product 1β-(1-carboxyethyl) - 5 - oxo - 7aβ-methyl-3aα-hexahydroindane-4α-propionic acid (8.61 g.).

EXAMPLE 13

According to the procedure described in Example 12, 60 g. of cholic acid (instead of 3β-hydroxy-23-norchol-5-en-22-oic acid) is cultivated in 3×30 liters-jar fermenters and treated, whereby 32.3 g. of crude product 4α-(2-carboxyethyl)-5-oxo-7aβ, γ - dimethyl-3aα-hexahydroindane-1β-butyric acid is obtained.

The same treatment with 3β-hydroxychol-5-enic acid affords the same product.

EXAMPLE 14

According to the procedure described in the above Example 12, but using a mixture consisting of sodium cholate and a compound selected from sodium 3-oxopregn-4-en-21-oate, sodium 24-norcholate, sodium 3β-hydroxychol-5-ene - 24 - carboxylate, sodium 3β-hydroxy-27-nor-5β-cholestan-26-oate and sodium 3-oxo-5α-cholestan-25-oate instead of sodium 3β-hydroxy-23-norchol-5-en-22-oate, the respective products, 1β-carboxymethyl-5-oxo-7aβ-methyl-3aα - hexahydroindane - 4α - propionic acid, 4α-(2-carboxyethyl) - 5 - oxo-7aβ,β-dimethyl-3aα-hexahydroindane-1β-propionic acid, 4α-(2-carboxyethyl)-5-oxo-7aβ,δ-dimethyl - 3aα - hexahydroindane-1β-valeric acid, 4α-(2-carboxyethyl) - 5 - oxo-7aβ,ε-dimethyl-3aα-hexahydroindane - 1β - caproic acid and 4α-(2-carboxyethyl)-5-oxo - 7aβ,α,ε - trimethyl - 3aα - hexahydroindane-1β-caproic acid are obtainable as crystalline products.

EXAMPLE 15

Inoculant (700 ml.× 4) is prepared from an aqueous solution containing 0.5% of glucose, 0.5% of polypeptone, 0.5% of corn steep liquor, 0.1% of sodium 17α-hydroxy-3-oxoandrost-4-ene - 17β - carboxylate by seeding Corynebacterium (Arthrobacter) simplex, followed by cultivation at 28° C. for 48 hours. Four jar-fermenters containing a total of 73 liters of culture medium containing:

| | Percent |
|---|---|
| Ammonium sulfate | 0.2 |
| Potassium dihydrogen phosphate | 0.1 |
| Magnesium sulfate (heptahydrate) | 0.05 |
| Potassium chloride | 0.05 |
| Ferrous sulfate (heptahydrate) | 0.01 |
| Yeast extract | 0.05 |
| Sodium 17α - hydroxy - 3 - oxoandrost-4-ene-17β-carboxylate | 0.01 | is sterilized by heating at 120° C. for 20 minutes and adjusted with aqueous sodium hydroxide to pH 7.2. The inoculant prepared above is added into each fermenter. Cultivation is carried out under the condition fo reciprocal shaking 300 r.p.m., internal pressure 0.5 kg./cm.$^2$, aeration rate 23 liters/min., for 42 hours at 29° C. (the formation of the product is traced by thin-layer chromatograms of a part of culture broth). The culture broth is concentrated to one eighth of the original volume under reduced pressure, aqueous hydrochloric acid added to adjust pH at 2.0 and extracted with ethyl acetate. The organic layer is washed with water, dried and concentrated. The separated crystals are collected by filtration, ether is added to the mother liquor and the separated crystals are collected by filtration and combined with the crystals obtained above. Forty four grams of the crude crystals are recrystallized from acetone-ether to give 43.1 grams of 1β-carboxy - 1α-hydroxy - 5-oxo-7aβ-methyl - 3aα - hexahydroindane-4α-propionic acid, M.P. 151–153° C. Yield 66.3% of pure product. Analytical sample melts at 153–154° C. $[\alpha]_D^{23} -2.6 \pm 0.4°$ (c.=0.962, ethanol).

IR.: $\nu_{max.}^{Nujol}$ 3494, 3450, broad peak at around 2666, 1698 cm.$^-$

Analysis.—Calcd. for $C_{14}H_{20}O_6$ (percent): C, 59.14; H, 7.09. Found (percent): C, 59.37; H, 7.15.

EXAMPLE 16

According to the procedure described in the above Example 1, but using sodium 3 - oxo - 17α - hydroxypregn - 4 - ene - 20 - carboxylate instead of sodium cholate, there is obtained 4α-(2-carboxyethyl)-1α-hydroxy-5-oxo - 7aβ,α - dimethyl - 3aα - hexahydroindane-1β-acetic acid.

EXAMPLE 17

On treatment with aqueous sodium hydroxide solution or potassium hydroxide solution, the products obtained in the above Examples 1 to 16 afford the corresponding disodium salts or dipotassium salts, which have the respective melting points higher than 300° C.

What is claimed is:
1. A process for preparing a compound of the formula:

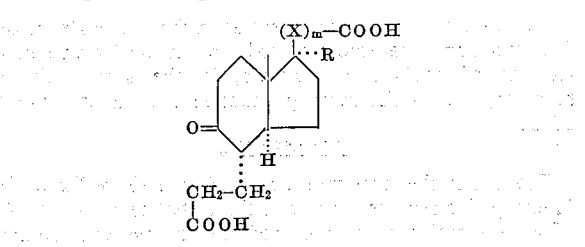

wherein X is selected from the group consisting of $$-CH_2-, -CH(CH_3)-$$

and $-CH(CH_3)-(CH_3)_n-$, in which n is an integer from 1 to 4 inclusive, m is zero or 1; and R is a hydrogen atom or a hydroxyl group, which comprises cultivating Corynebacterium simplex in a culture medium containing as carbon source a compound of the formula:

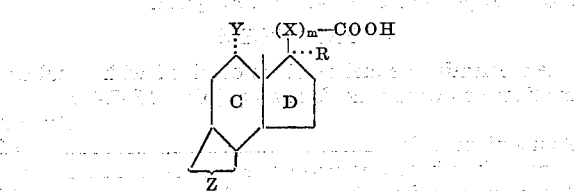

wherein X, m and R have the same significances as above, Y is a hydrogen atom or a hydroxyl group, and Z is a member selected from the group consisting of:

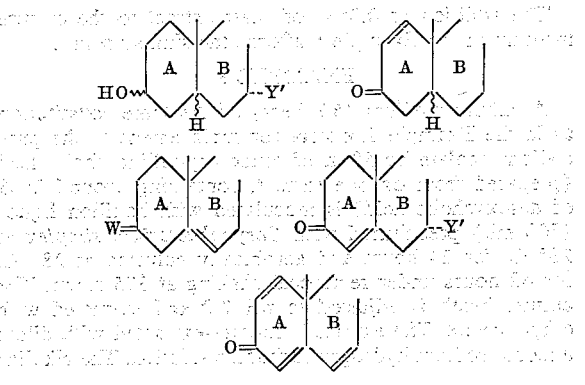

wherein Y' is a hydrogen atom or hydroxyl group, W is an α- or β-hydroxyl group or an oxo group, and the broken line means absence or presence of a double bond, and recovering the said product.

2. A process claimed in claim 1, which comprises carrying out the cultivation without addition of other carbon sources.

3. A process claimed in claim 1, which comprises carrying out the cultivation with adapted microorganism.

4. A process claimed in claim 1, which comprises carrying out the cultivation in the presence of cholic acid.

References Cited

SIH et al.: J. Am. Chem. Soc., vol. 85, pp. 2135–2137, July 1963.

ALVIN E. TANENHOLTZ, Primary Examiner

U.S. Cl. X.R.

260—514